United States Patent [19]
Brodsky et al.

[11] Patent Number: 5,774,186
[45] Date of Patent: Jun. 30, 1998

[54] INTERRUPTION TOLERANT VIDEO PROGRAM VIEWING

[75] Inventors: Marc Herbert Brodsky, Washington, D.C.; Steven Edward Millman, Spring Valley, N.Y.; Thomas Kimber Worthington, Kula, Hi.

[73] Assignee: International Business Machines Corporation, Armonk, N.Y.

[21] Appl. No.: 659,125

[22] Filed: Jun. 4, 1996

Related U.S. Application Data

[60] Provisional application No. 60/009,435, Dec. 29, 1995.
[51] Int. Cl.[6] ................................................ H04N 5/445
[52] U.S. Cl. .......................... 348/553; 348/563; 348/567
[58] Field of Search .................................... 348/553, 563, 348/564, 565, 567, 569, 588, 722, 714, 725, 734; H04N 5/445

[56] References Cited

U.S. PATENT DOCUMENTS

| 4,602,297 | 7/1986 | Reese. | |
|---|---|---|---|
| 4,752,834 | 6/1988 | Koombes. | |
| 4,789,961 | 12/1988 | Tindall. | |
| 4,924,387 | 5/1990 | Jeppesen. | |
| 5,027,400 | 6/1991 | Baji et al.. | |
| 5,118,105 | 6/1992 | Brim et al.. | |
| 5,172,413 | 12/1992 | Bradley et al.. | |
| 5,612,749 | 3/1997 | Bacher | 348/553 |
| 5,635,984 | 6/1997 | Lee | 348/564 |

Primary Examiner—Sherrie Hsia
Attorney, Agent, or Firm—Daniel P. Morris

[57] ABSTRACT

Allows a video broadcast viewer to pause at anytime while viewing a program, and upon returning to be able to view the intervening segment. The video received during the pause period is stored and available for recall upon user command. The storage medium is circular in so much that the memory, upon becoming filled to capacity continues to write incoming information data over the previously stored data. The storage circuits employs a sequential access storage device and/or a direct access storage device. The storage circuit has a high speed memory input buffer and a high speed memory output buffer to account for the relatively long READ and WRITE access times of the storage device employed. At the end of the pause period, the user can view the stored video. The user has a choice between catching up to the regular broadcast or watching the remaining program video in a delay mode. The stored video may be viewed intermittently or continuously in regular, slow or fast motion, under user direct or remote VCR-type of video function control.

33 Claims, 5 Drawing Sheets

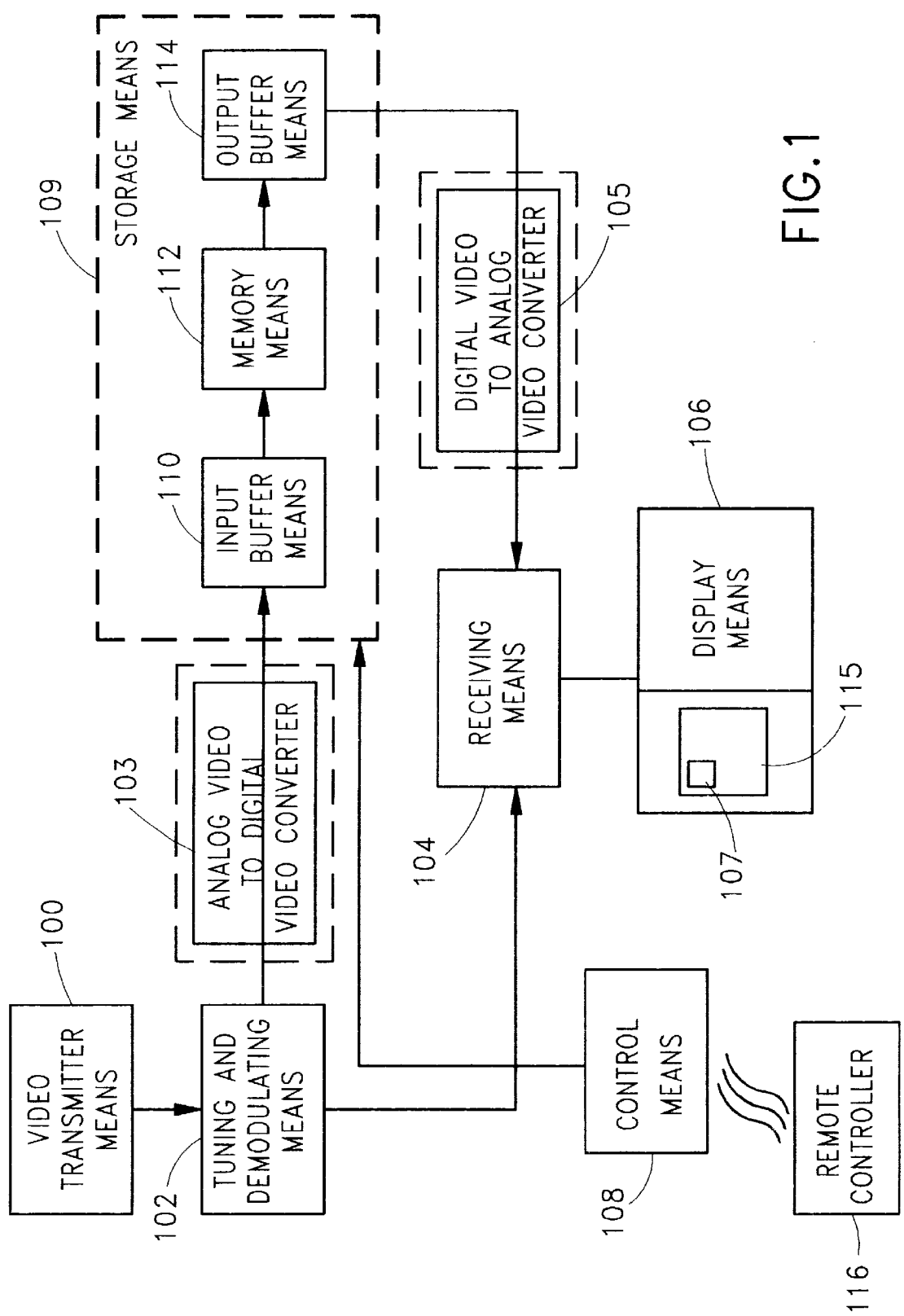

| COMMAND FUNCTION/ ALGORITHM | SET TUNING CIRCUIT OUTPUT CONNECTION | SET MEMORY INPUT ACTIVITY | SET MEMORY OUTPUT ACTIVITY | SET RECEIVER ACTIVITY | SET DISPLAY ACTIVITY |
|---|---|---|---|---|---|
| UN-INTERRUPTED VIEWING | CONNECTED TO RECEIVER INPUT | INACTIVE | INACTIVE | RECEIVING FROM TUNING CIRCUIT | DISPLAYING REGULAR VIDEO TRANSMISSION |
| DISPLAY PAUSE | CONNECTED TO MEMORY INPUT | RECEIVING FROM TUNING CIRCUIT | INACTIVE | INACTIVE | INACTIVE |
| DISPLAY MEMORY | CONNECTED TO MEMORY INPUT | RECEIVING FROM TUNING CIRCUIT | OUTPUTTING STORED VIDEO TO RECEIVER | RECEIVING FROM MEMORY | DISPLAYING STORED VIDEO |

FIG.2

| COMMAND FUNCTION ALGORITHM | SET TUNING CIRCUIT OUTPUT | SET INPUT BUFFER ACTIVITY | SET DASD 1ST PORTION ACTIVITY | SET SASD ACTIVITY | SET DASD 2ND PORTION ACTIVITY | SET OUTPUT BUFFER ACTIVITY | SET RECEIVER ACTIVITY | SET DISPLAY ACTIVITY |
|---|---|---|---|---|---|---|---|---|
| UN-INTERRUPTED VIEWING | CONNECT TO RECEIVER INPUT | INACTIVE | INACTIVE | INACTIVE | INACTIVE | INACTIVE | RECEIVE FROM TUNING CIRCUIT AND FEED DISPLAY | DISPLAY REGULAR VIDEO TRANS-MISSION |
| LONG PAUSE | CONNECT TO INPUT BUFFER | RECEIVE FROM TUNING CIRCUIT AND FEED DSAD 1ST PORTION | RECEIVE FROM INPUT BUFFER AND FEED SASD | RECEIVE FROM DASD 1ST PORTION AND FEED DASD 2ND PORTION | INACTIVE (OR RECEIVE FROM SASD) | INACTIVE | INACTIVE | INACTIVE |
| DISPLAY LONG MEMORY | CONNECT TO INPUT BUFFER | RECEIVE FROM TUNING CIRCUIT AND FEED DSAD 1ST PORTION | RECEIVE FROM INPUT BUFFER AND FEED SASD | RECEIVE FROM DASD 1ST PORTION AND FEED DASD 2ND PORTION | RECEIVE FROM SASD AND FEED OUTPUT BUFFER 2ND PORTION | RECEIVE FROM DASD 2ND PORTION AND FEED RECEIVER | RECEIVE FROM OUTPUT BUFFER AND FEED DISPLAY | DISPLAY STORED VIDEO FROM SASD (AND DASD) |

FIG. 4

INTERRUPTION TOLERANT VIDEO PROGRAM VIEWING

This application claims priority from Provisional Application Serial No. 60/009,435 which was filed Dec. 29, 1995.

FIELD OF THE INVENTION

The present invention is directed to the field of video, monitoring, storage and playback. It is more particularly directed to concurrent storage of a video signal being received and display of a previously stored signal.

BACKGROUND OF THE INVENTION

It is a constant endeavor to find ways of enhancing a users ability to satisfy personal priorities while viewing a transmitted video program. It is quite usual for a user to be interrupted to satisfy a higher priority requirement while viewing a desired program. The interruption could be a phone call received during a broadcast video program being transmitted in a time continuum. This type of viewing interference, although of relatively short duration, would heretofore cause a loss of the program portion transmitted for the duration of the interruption. This may occur several times during a long program or movie with significant loss of program continuity and the disruption in received information and/or entertainment.

Control over the transmission and receiving of TV systems, has historically been exercised by the broadcaster of the system. Thus, pausing for higher priority events has not been generally feasible. In video on demand systems, network bandwidth source and switch limitations today impede total video on demand with respect to limitless incremental intervals.

SUMMARY OF THE INVENTION

It is therefore an object of the present invention to provide an apparatus to provide a user with a means for commanding a portion of a video program broadcast or other transmission in progress to be stored, and the ability to recall for viewing that stored portion at the users convenience. The stored video may be viewed intermittently or continuously in regular, slow or fast motion, under the user's direct or remote VCR-type of video function control.

It is another object of the present invention to provide the user with a method and apparatus to catch up with the regular broadcast and/or other transmission of that program.

It is still another object of the present invention to provide to the user full VCR type controls for that portion of the program that is in storage. These controls include play, rewind, fast and slow forward, pause, continue, screen splitting frame skipping, and picture in picture.

It is still another object of the present invention to provide to the user the ability to review an immediately previously broadcast portion of a program being viewed.

In one embodiment of the invention, a video signal viewing apparatus has a user command circuit, a receiver circuit coupled to the command circuit, and a display means coupled to the receiver circuit. The apparatus includes an input buffer circuit for receiving and buffering the signal portion of interest; a memory circuit coupled to the output of the input buffer for storing the signal portion; and an output buffer circuit coupled to the memory circuit for receiving and buffering the memory output. The command circuit causes the output of the output buffer to be coupled to the receiver circuit for display on the display means upon receiving a command from the user. It is preferable that the apparatus memory circuit includes at least one direct access storage device (DASD), or at least one sequential access storage device (SASD) or a combination of these.

It is desirable for the memory circuit to be of a circular type which upon becoming filled to capacity continues to write incoming information data over the previously stored data.

In one embodiment of the present invention the user has an interruption for a duration during which an amount of video data is transmitted. It is desirable that the memory circuit have a capacity at least equal to the amount of video data transmitted in that duration.

In one embodiment of the present invention the video signal comprises an entire program's video signal content and the signal portion includes up to and including the entire program's video signal content.

In still another aspect of the present invention an apparatus is provided which receives a video signal and is user command controlled. The apparatus includes a video input circuit for receiving the video signal and a receiving circuit which has a first receiver input coupled to the video input circuit for receiving the video, a second receiver input and a receiver output. The apparatus also has a display means coupled to the receiving circuit for receiving the receiving circuit output and for displaying the video signal; a storage circuit for receiving and storing a portion of the video signal; and a control circuit which responds to the user command and causes the storage output to be coupled to the second receiver input for displaying the signal portion on the display means when so commanded by the user. It is desirable that the storage circuit includes an input buffer circuit, a memory circuit coupled to the input buffer output for storing the portion, and an output buffer circuit for receiving and buffering the memory output. It is also desirable that the storage circuit includes at least one direct access storage device, or at least one sequential access storage device or a combination of these.

Another aspect of the present invention is a method for servicing a user being interrupted while viewing a video signal on a display. The signal has a portion transmitted during the duration of the interruption. The method includes the steps of: receiving the video signal; coupling the portion to a circular storage circuit; storing the portion in the storage circuit; commanding the portion stored to be displayed at the end of the interruption; and feeding the portion to the display upon receiving the command. It is desirable that the step of coupling further comprises the steps of input buffering and feeding the portion to a memory circuit and the step of feeding be preceded by a step of output buffering.

Still another aspect of the present invention is a device which has means to receive and display a video signal. The device includes at least one direct access storage medium; an input buffer coupled to the medium; an output buffer coupled to the medium; a storage hierarchy for storing a portion of the video signal in the medium and buffers; a means for routing the portion stored to the display; and a means for controlling the display. The means for controlling the display includes the functions of display pause; continue; normal, slow and fast playback; rewind; selective picture; frame skipping and picture in picture format.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 1 shows an embodiment of the present invention.

FIG. 2 shows an algorithm used by the present invention when the user is ready to again view the display.

FIG. 4 shows the long-memory-display algorithm of the present invention.

DETAILED DESCRIPTION OF THE INVENTION

Figure 3:
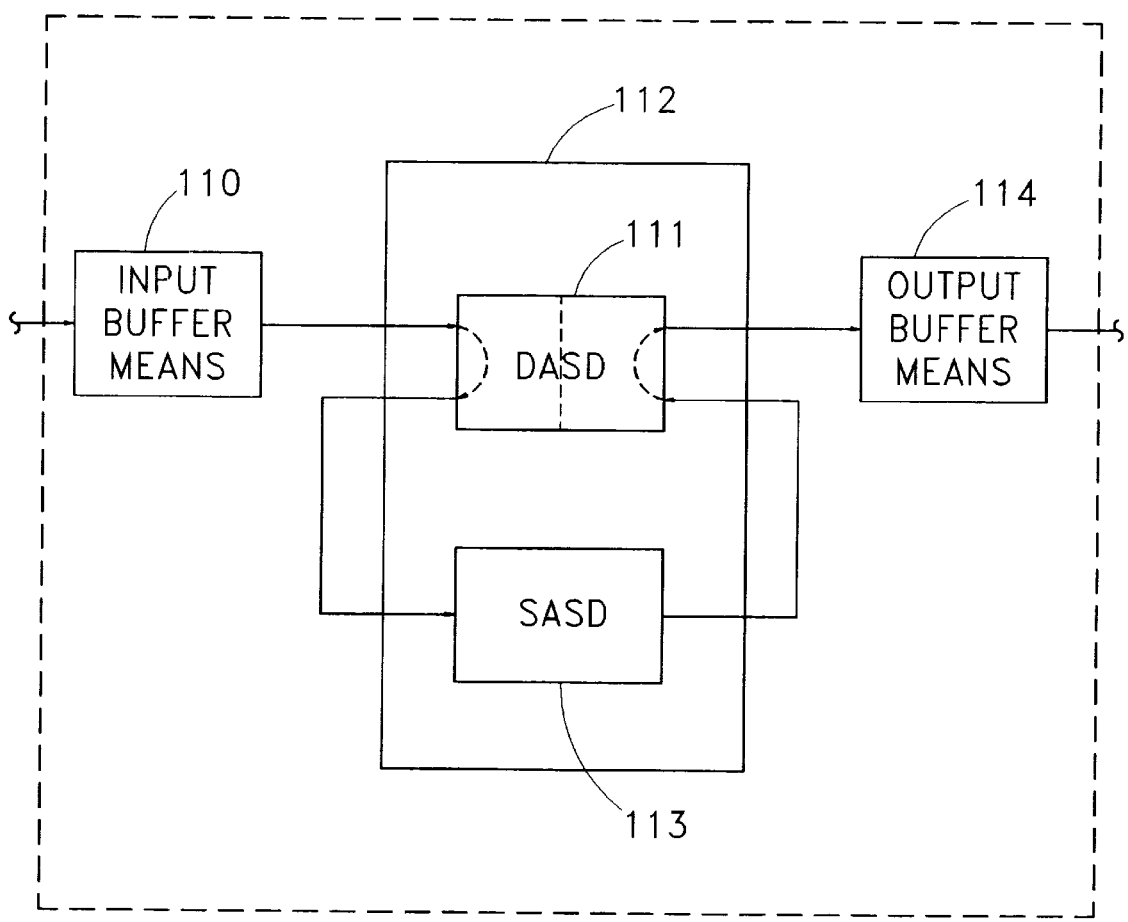
FIG. 3 shows the addition of a sequential access storage device to the memory circuit of the present invention.

The present invention provides a method and apparatus to enable interruption tolerant video program viewing. The method and apparatus of the present invention are advantageous in receiving standard broadcast TV transmissions, cable-TV transmissions, and/or public or private continuous transmission of a program. A feature of the invention is a storage hierarchy that includes at least one direct access, non-sequential, storage medium along with algorithms employing data buffers. The techniques are employable for both analog and/or digital video transmissions.

In one embodiment, the user's video receiver and display is provided with an apparatus which has a user command circuit. It allows the user, upon being interrupted, to command the video broadcast display to be paused, and to initiate storage of the subsequent portion of the video in progress for the duration of the interruption. Upon returning, the user is able to command that the stored portion be displayed. The display can be adapted to allow the user to catch up to the regular broadcast, or continue to watch the video in delay mode. The stored video may be viewed intermittently or continuously in regular, slow or fast motion, under the user's direct or remote VCR-type of video function control. The apparatus includes an input buffer circuit for buffering the video received during the interruption for proper feeding into a memory device. Upon user command, the stored video is fed out from the memory device to the display. The apparatus also includes an output buffer circuit to act as a buffer between the output of the memory device and the display. Input and output buffering with high speed READ / WRITE capable circuitry is required because of the relatively slow READ / WRITE access times of the moderate capacity storage devices. The buffering is generally accomplished using a high speed silicon memory device. The amount of buffer memory required depends upon the efficiency of the READ/WRITE algorithms employed, as known to those skilled in the art. It is desirable that the storage device have a capacity at least equal to the amount of video data transmitted for the predetermined maximum duration of a serviceable interrupt.

In one embodiment of the present invention the video signal comprises an entire program's video signal content and the signal portion includes up to and including the entire program's video signal content. For this situation, the apparatus memory generally includes at least one direct access storage device, and at least one sequential access storage device. The sequential access storage device has a very large memory capacity, but also has a relatively long access time for READ and WRITE. The direct access storage device would desirably be able to provide both input and output buffering for the sequential access storage device.

In one embodiment of the present invention the apparatus includes a video display control function. The controlled functions include play, rewind, stop, continue, normal forward, fast forward, and slow forward. It is desirable that the control function is controlled by a remote control circuit and that it include a provision for selection of catchup functions. Catchup functions include selection of picture in picture, frame skipping and/or screen splitting. Picture in picture may be used to show the picture from the stored video on a portion of the display, within the full display showing of the picture of the program in progress, or vice versa. Split screen may be used to show the picture from the stored video one side of the display area, and the picture of the program in progress on the other side of the display area. Selective picture allows the user to select which picture to display at a particular moment, the stored video or the picture of the program in progress. The user may switch from one to the other according to the user's desire.

The present invention also provides a method for servicing a video program user being interrupted while viewing a video signal on a display. The method enables storage of the portion of the video signal transmitting during the duration of the interruption and subsequent viewing. The method includes the steps of pausing the display, coupling the subsequently received to a storage medium, storing it in the storage medium, responding to a command to display the portion, and feeding the portion to the display. It is desirable that the step of coupling includes the step of input buffering, and the step of feeding be preceded by a step of output buffering.

An embodiment of the present invention is shown in FIG. 1. FIG. 1 shows an external transmitter means 100 which transmits the user selected video program. In normal receive mode, the tuning and demodulating circuit 102 routes the selected, received, and digitized transmission to a receiver circuit 104 which feeds the display means 106. In a simple form this constitutes and operates in accordance with a standard digital TV receiver. A control circuit 108 enables a user to PAUSE the display and cause the digital video to be fed to an input buffer circuit 110, within storage circuit 109. The input buffer circuit 110 is a dual port video buffer which simultaneously accepts the video transmissions and feeds it to a memory circuit 112 for storage. A memory circuit 112, within storage circuit 109, includes at least one direct access storage device (DASD) 111. Upon user command the control circuit 108 causes the memory circuit 112 to feed the stored video to be fed to an output buffer circuit 114 within storage circuit 109. The output buffer circuit 114 sends the video signal to the receiver circuit 104 for display on the display means 106. User command is normally transmitted to the control circuit 108 via a remote controller 116. The transmitting circuit 100, tuning and demodulating circuit 102, receiving circuit 104, remote control circuit 116 and display means 106 may all be identical to those used in standard TV reception. In actuality the input buffer circuit 110 and the output buffer circuit 114 are in themselves temporary memory devices supporting the memory circuit 112. If the tuning and demodulating circuit 102 output is in analog video, an analog video to digital video converter 103 is used to form digitized video prior to its being fed to the input buffer 110. In addition, the output video from the output buffer circuit 114 is fed to digital video to analog video converter 105 to form an analog video signal prior to its being fed to the receiving circuit 104.

It is desirable for the memory circuit to be of a circular type, which upon becoming filled to capacity continues to write incoming information data over the previously stored data. Thus if the memory capacity is for 15 minutes of video data, the data received in the 16th minute overwrites the locations holding the data received during the first minute, and so on. In this way, once the memory is filled with 15 minutes of video, new data continues to be stored by overwriting the older video. Thus, the memory always contains the video corresponding to the last 15 minutes.

In one embodiment, upon receiving an interrupt, a user issues a DISPLAY PAUSE command which initiates the pause algorithm. The pause algorithm starts with the video signal being fed to the input buffer circuit 110 and stored in the memory circuit 112, preferably a DASD 111. The DASD 111 becomes occupied with the subsequent video data. In that it is dual port, the buffer simultaneously receives subsequent digitized video signal from the video source and outputs a delayed previous portion of that video signal to the memory circuit 112. This works satisfactorily as long as the memory capacity is such as to be able to accommodate the incoming video data for the duration of the interruption. With current direct access storage devices, compression techniques and input video rates, this condition is easily satisfied for interruptions ranging from a few minutes to well over an hour. When the user is ready to resume watching again, the user issues a command to DISPLAY MEMORY. This initiates the memory-display algorithm shown in FIG. 2. As shown in FIG. 2, the input buffer circuit 110 continues to receive and temporarily store the subsequent video data, and outputs its oldest stored data to the DASD 111. The DASD 111 WRITEs the received video data into the next storage location, and outputs its previously stored video data in the sequence received, in a first-in first-out format. The output buffer circuit 114 receives the DASD 111 output and feeds its earliest received video data to the receiving circuit 104 for display on the display means 106. This memory-display algorithm ensures that new video data which is currently being transmitted is concurrently stored while the user views the stored video.

This algorithm requires that during each cycle both a READ and a WRITE of the storage device take place to each video buffer. This is most readily accomplished using a dual port buffer. In some cases it may be advantageous to use a combination of two single port video buffers as an alternative to the dual port buffer. With two single port buffers, at each cycle one buffer is being filled with the input signal while the other is independently and simultaneously outputting its data to the storage device.

Each buffer alternates READ and WRITE operations, one READs the input video while the other WRITEs its stored. video. Since both a READ and a WRITE of the storage device to each video buffer must be done during each cycle, the video buffer size needs to be approximately twice that required for the PAUSE sequence described above. Intelligent file data storage and retrieval methods which allow for the mechanical constraints of the storage device, the travel distance and number of times required to access the device, can be used to optimize the durations of each READ and WRITE.

An alternate configuration, most applicable to situations of long duration interrupts and therefore requiring long periods of video storage, is shown in FIG. 3. FIG. 3 shows the addition of a sequential access storage device (SASD 113) to the memory circuit ( 112 of FIG. 1 ). A SASD 113 has much larger storage capacity than a DASD 111. The SASD 113 could be formed using magnetic tape memory or preferably an optical disk with READ and WRITE capability. Although SASDs presently have a relatively long access time, the DASD 111 provides more than sufficient input and output buffering to prevent information loss. Use of the SASD 113 requires an additional READ and WRITE of the DASD 111. First, a section of data which has been stored on the DASD 111 is archived to the SASD 113. Then the DASD 111 retrieves a section of data which has been archived on the SASD 113 for eventual display. With data rates of about 3 Mbytes/seconds for direct access storage devices, the video data stream must be compressed.

In a modification of this embodiment the input buffer and output buffer have enough, usually silicon, memory to buffer the access times of the SASD. In this situation the SASD would just replace the DASD. This is becoming more and more economically practical with the development of optical disks with reduced access times, and the availability of cheaper and more dense silicon type memory. Silicon devices are the memories of choice for the buffers.

When available in the receiving apparatus, the SASD 113 is generally put to use when the user knows that an interruption is going to take a long time such that the required video data storage is more than the capacity of the DASD 111. This is indicated by the user issuing a LONG PAUSE command. This initiates the long-pause algorithm which starts feeding the video signal to the input buffer circuit 110, and activating both the DASD 111 and SASD 113 portions of the memory circuit. For this description it is advantageous to initially consider the DASD 111 to be segmented into a first portion and a second portion. The portions are most generally of equal capacity but each has a minimum required capacity. The first portion's capacity must be greater than the amount of video data received in a time equal to the SASD's worst case WRITE access time. The second portion's capacity must be greater than the amount of video data received in a time equal to the SASO's worst case READ access time. The input buffer circuit 110 feeds the first portion of DASD 111 which sends its output to the SASD 113. At any instant, both the DASD 111 and the SASD 113 have stored video information. In this embodiment, the leading and major portion of the stored video resides in the SASD 113 followed by that stored in the first portion of DASD 111. The second portion is only called upon when the SASD 113 starts WRITING out. This occurs both at SASD overflow and in response to DISPLAY LONG MEMORY command.

When the user is ready to resume watching again, the user issues a command to DISPLAY LONG MEMORY initiating the long-memory-display algorithm shown in FIG. 4. As shown in FIG. 4, the input buffer circuit 110 continues to receive and temporarily store the subsequent video data, and outputs its oldest stored data to the first portion the DASD 111. The first portion DASD 111 WRITEs the received video data into its next storage location, and continues to output its previously stored video data in the sequence received to the SASD 113. The SASD 113 WRITEs its received video data into its next storage location, and continues to concurrently output its previously stored video data in the sequence received to the second portion of DASD 111. The second portion of DASD 111 WRITEs the received video data into its next storage location, and continues to concurrently output its previously stored video data in the sequence received to the output buffer circuit 114. The output buffer circuit 114 receives the DASD 111 output and outputs its earliest received video data to the receiving circuit 104 for display on the display means 106. This long-memory-display algorithm also ensures that new video data which is currently being transmitted is stored while the user views the stored video.

An alternate embodiment of the long-pause algorithm has the first portion of DASD 111 filling the second portion of DASD 111 prior to feeding the SASD 113. In this case, the leading part of the stored video resides in the second portion of DASD 111, followed by the part in the SASD 113, followed by the part in the first portion of DASD 111. This speeds up the long-memory-display algorithm by at least the READ access time of the SASD 113.

In a desirable alternative the SASD is automatically activated when the amount of video storage is approaching the capacity of the DASD's memory. With this capability the apparatus changes from operating with the pause algorithm to operating with the long-pause algorithm. If this happens, when the user is ready to resume watching again, the system automatically uses the long-memory-display algorithm shown in FIG. 4, instead of the memory-display algorithm shown in FIG. 2.

It is noted that in the simplest form the first and second portion of DASD 111 are easily implemented by using a separate DASD for each portion. However, a single DASD 111 can be used in coordination with proper input and output buffer sizes, in which the READ and WRITE cycles of each device are implemented intelligently such that the duration of each cycle, and so the amount of video data handled in each cycle, is optimized for video data transfer, without data loss or buffer overflow. It is desirable to give the user returning after an interruption a choice of catching-up with the video program or viewing the remainder of the program with a fixed delay. The fixed delay would be equal to the duration of the interruption. Catching up with the regular program transmission enables the user to use this interruption scheme repeatedly for the entire capacity of the memory circuit 112.

If the user does not wish to catch up to the real time transmission, as is likely in a technical lecture or in movies on demand, only the algorithm shown in FIG. 2 is executed. If the user chooses to eventually catch up to the real time transmission as is highly likely in normal TV transmission, catchup may be accomplished in one of several ways. One way is to discard some video frames by employing frame skipping, such that one out of every so many frames of data are discarded consistent with a discard rate. The frame discard rate may be user set or alternatively it may be automatically calculated from a user specified amount of time allowed to catch up to the regular programming.

A second way to catch up with the regular video transmission, is to cut out from displaying or rush through the display of specific portions of the data which do not interest the user. This may include skipping commercials in a manner known to those skilled in the art. A third way is to play back the stored video at faster than normal display rate. A fourth way is to simultaneously display the stored data together with the continuing video in different sections of the user's display. This can be accomplished by splitting the screen or in a way analogous to picture in picture (PIP).

In an alternate embodiment, all received video transmissions of the user selected program are continuously fed simultaneously to both the receiving circuit 104 and the input buffer circuit 110. The user views the program fed through the receiver circuit 104 on the display means 106 in normal fashion. The input buffer circuit feeds the received video data to the memory circuit 112 for storage. In this way the memory circuit fills to its storage capacity of $C_{storage}$ bytes with the video program. Memory storage operates in circular mode and is cyclic over $C_{storage}$ bytes of video. Once it is filled to capacity each next cycle of received video data overwrites that of the previous cycle. Thus, any time after receiving the first $C_{storage}$ bytes of the video program, the memory has the immediately previous $C_{storage}$ bytes of program data stored in the DASD 111 memory. At any time, the user can issue a DISPLAY MEMORY command to the control circuit 108 causing the output buffer circuit 114 to be fed to the receiving circuit 104 for output to the display means. In this embodiment, the user need not pause the operation upon an interruption. Rather, the user only needs to command that the video being displayed should come from storage via the output buffer 114 rather than directly from the tuning and demodulating circuit 102. The user may view this in picture in picture mode. The video in progress may be shown on the full screen 115, with the stored video being shown on a portion of the screen 107. This may also be viewed in split screen with portion 107 representing a split screen. In selective screen either the video in progress or the stored video, in accordance with the user's selection, would be on the full screen 115. Any catching-up circuit may be used with this embodiment.

An estimate of the required amount of memory storage is obtained by considering that 2 Mbytes of digital data are transmitted each second for video which is not compressed. This corresponds to 120 Mbytes/minute. Thus, 15 minutes of non-compressed video requires 1.8 Gbytes of storage capacity. Compression schemes will reduce the amount of storage needed by the particular compression ratio. For example, the MPEG-1 format for compressed audio and video is 1.5 Mbits/second, or 187.5 Kbytes/second. This would require less than 170 Mbytes of storage for 15 minutes of video, and only 675 Mbytes for an hour of MPEG-1 compressed video. In addition, longer videos may be stored either on multiple direct access storage devices or on a hierarchy involving both direct access storage devices and sequential access storage devices such as optical disks and tape drives. For example, tape drives whose access times are in the order of seconds are now available. Thus a hierarchy involving a sequential access storage device along with a direct access storage device can store very long videos.

The minimum size of the video input buffer circuit 110 may be estimated by noting that the buffer must be large enough to temporarily store the video data received during the largest access time of the storage device employed in the memory circuit 112. A storage device with an access time of 15 msec requires a buffer of 230 Kbytes of data for non-compressed video. Compression schemes would significantly reduce the size of the input buffer circuit 110. For practical compatibility with TV and direct access storage devices, it is best to choose a buffer size which is an integral multiple of the frame field and close to the sector size of the storage device. The required buffer size, even for non-compressed video, is well within video buffers available presently. In cases where the video is received in compressed format, the receiving circuit includes a circuit for decompression.

It is desirable that the present invention allow memory play, rewind, stop, continue and normal, fast and slow motion display. It is preferable that these functions are controlled by the user using a remote controller (116 in FIG. 1). This is best employed in an embodiment wherein all transmission are continuously stored in the storage device, as opposed to previously only storing it when the user wishes to pause. The storage algorithm may be the same as described in the pause algorithm or the long-pause algorithm. As with the previously described modalities, if the storage devices memory is not large enough to store the entire program transmission, earlier parts of the program are overwritten by the new transmission. When the user specifies how many frames or units of time to rewind, the position of this data on the direct access storage device is calculated and the algorithm for display-memory can be used as in FIG.

2. The display may be commanded to occur in normal speed, slow motion, or faster than normal speed.

Figure 5:
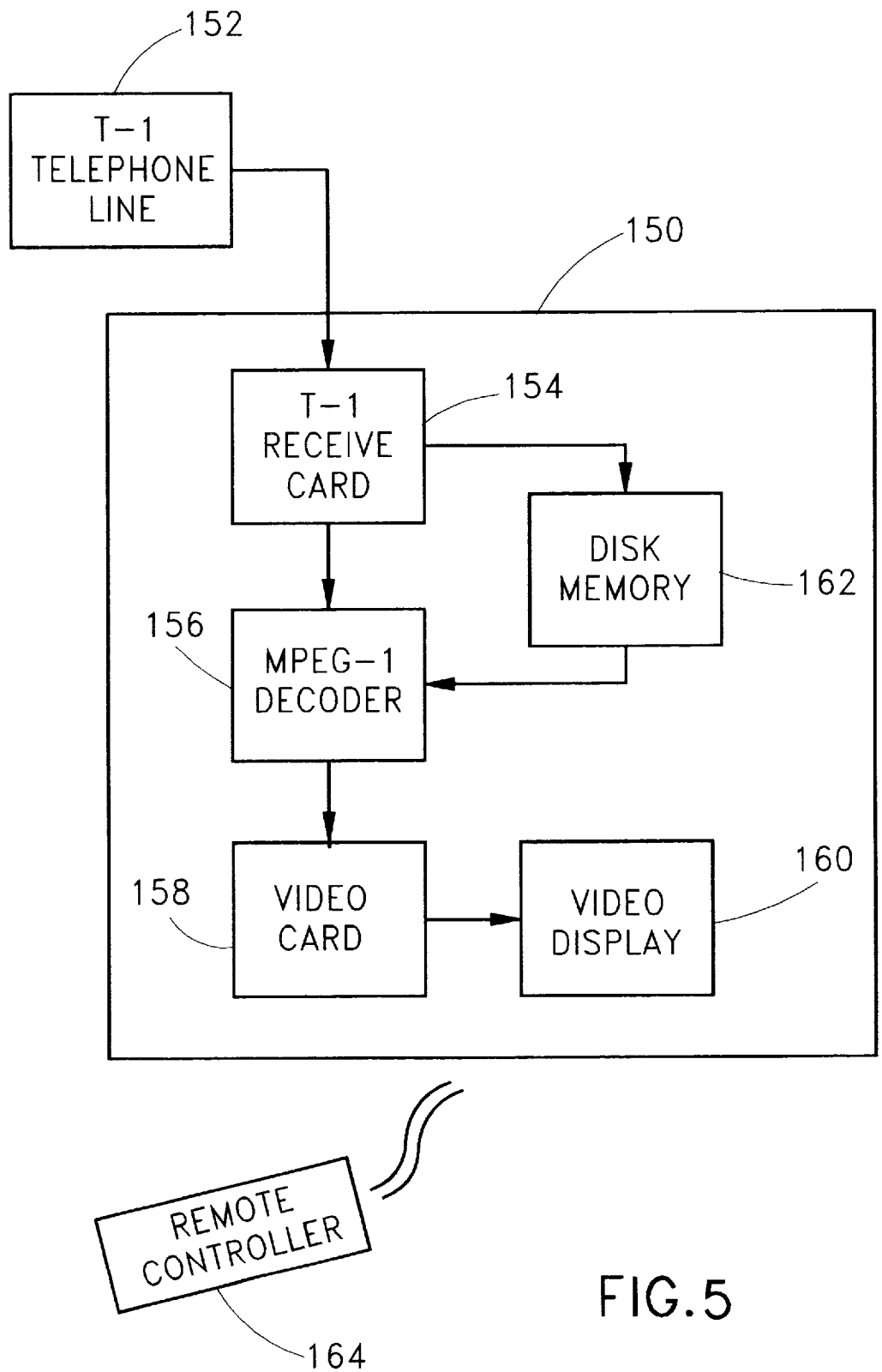
FIG. 5 shows an embodiment of the present invention when video transmission is received from a T-1 telephone line.

The present invention is advantageous in many situations. These include home, library, educational or industrial environments where TV signals arrive either by broadcast, cable, satellite or telephony. FIG. 5 shows a system implementing the present invention for a case where the input video is received from a T-1 telephone line 152, which provides 1.544 MHz of analog bandwidth. When used for a digital signal, digital information is transmitted and received over a T-1 line using a modem. The digital data rate is commensurate with the bits/Hz capability of the modem employed. The system in FIG. 5 uses a 1 bit/Hz modem connected to the T-1 line 152. The T-1 line 152 output is fed to a T-1 receive card 154, which buffers the subsequent video data. It is capable of receiving a video program compressed in MPEG-1, 1.5 Mbi/sec format. Until the system is paused by a user, the received video is fed directly to an MPEG-1 decompressor and decoder card 156. The video is then passed to a video card 158 and is displayed on the video display 160. When the user issues a DISPLAY PAUSE command the video is transferred to the disk memory 162 after a predetermined amount of video data is received in the T-1 receive card's 154 memory. The disk memory 162 is put into a circular mode such that if its memory capacity becomes filled, subsequent video continues to be received and starts to overwrite the oldest data in the disk. This continues until the user issues a DISPLAY MEMORY command. Upon the user's issuing the DISPLAY MEMORY command, the earliest stored disk data is fed to the MPEG-1 decompressor and decoder card 156 from which it is fed for display on video display 160. If the duration of the pause is short, such that the disk memory is not filled when the user issues the DISPLAY MEMORY command, the disk continues to be filled while the display of the stored data commences. Each subsequent time the user issues a DISPLAY MEMORY command, the earliest stored disk data is displayed.

The T-1 receive card 154, the MPEG-1 decompressor and decoder card 156, and the video card 158 are inserted into a personal computer (PC) 150, which has a disk memory 162, and is configured to operate as a digital TV receiver and display. The PC screen or an external monitor may be used as the video display 160. The personal computer has the operational algorithms pre-loaded and may serve as a complete medium for implementing the present invention. Standard VCR type functions are remotely user controlled with a remote controller 164. The controller usually employs infra red technology.

The algorithms may be implemented in software, hardware or in a combination of software and hardware. Thus, although the present invention was described with particular embodiments in specific modalities, those familiar with the art realize that the concept and intent of the invention may be employed in many other configurations not directly described herein.

What is claimed is:

1. A video signal viewing apparatus having a receiver circuit, a user command circuit coupled to said receiver circuit, and a display means coupled to said receiver circuit, said apparatus further comprising:

an input buffer circuit coupled to said receiver circuit and having an input for receiving and buffering a portion of a signal, and an input buffer output;

a memory circuit coupled to said input buffer output for storing said portion, and having a memory output; and an output buffer circuit having an output buffer input coupled to said memory output for receiving and buffering said memory output, and an output buffer output; and wherein said command circuit causes said output buffer output to be coupled to said receiver circuit for feeding said portion for display on said display means upon receiving a command from a user input.

2. An apparatus as in claim 1 wherein said memory circuit includes a device selected from the group consisting of at least one of:

a direct access storage device; and a sequential access storage device.

3. An apparatus as in claim 1 in which said input buffer circuit further comprises:

an input coupling circuit for coupling said portion to said input for receiving; and a control circuit responsive to said user command circuit, coupled to said input coupling circuit, for causing said portion to be fed to said input for receiving when so commanded by said user.

4. An apparatus as in claim 1 in which:

said user has an interruption, said interruption having a duration; and wherein said signal portion corresponds to an amount of video data transmitted during said duration.

5. An apparatus as in claim 4 wherein said memory circuit has a capacity at least equal to said amount of video data transmitted.

6. An apparatus as in claim 4 wherein said duration is 15 minutes.

7. An apparatus as in claim 4 wherein said amount of video data transmitted is 170 Mbytes.

8. An apparatus as in claim 1 further including a video signal which comprises an entire program's video signal content; and wherein said signal portion includes said entire program's video signal content.

9. An apparatus as in claim 1 wherein said command circuit further comprises a video display function controller for controlling a function selected from a group consisting of at least one of: play, rewind, stop, still, continue, fast forward, and slow forward, selective picture, and picture in picture format.

10. An apparatus as in claim 9 wherein said controller is a remote controller.

11. A user command controlled apparatus receiving a video signal comprising:

a video input circuit for receiving said video signal and having a video output;

a receiving circuit having a first receiver input coupled to said video output for receiving said video signal, a second receiver input and a receiver output;

a display means having a display input coupled to said receiver output for receiving and displaying said video signal;

a storage circuit having a storage input coupled to said video output, and a storage output, said storage circuit receiving and storing a portion of said video signal; and a control circuit responsive to a user command coupled to said storage circuit and causing said storage output to be coupled to said second receiver input for feeding said portion for display on said display means when so commanded by a user.

12. An apparatus as in claim 11 wherein said storage circuit comprises:

an input buffer circuit for buffering said portion, forming said storage input and having an input buffer output;

a memory circuit coupled to said input buffer output for performing said storing, and having a memory output; and an output buffer circuit for receiving and buffering said memory output, said output buffer circuit forming said storage output.

13. An apparatus as in claim 11 wherein said storage circuit includes a memory element selected from the group of elements consisting of at least one of:

an input buffer;

a direct access storage device;

a sequential access storage device; and an output buffer.

14. An apparatus as in claim 11 in which:

said user having an interruption, said interruption having a duration; and wherein said signal portion corresponds to an amount of video data transmitted during said duration.

15. An apparatus as in claim 14 wherein said memory circuit has a capacity at least equal to said amount of video data transmitted.

16. An apparatus as in claim 14 wherein said duration is 15 minutes.

17. An apparatus as in claim 14 wherein said amount of video data transmitted is 170 Mbytes.

18. An apparatus as in claim 11 wherein:

said video signal comprises an entire program's video signal content; and wherein said signal portion includes said entire program's video signal content.

19. An apparatus as in claim 11 wherein said control circuit further comprises a video display function controller for controlling a function selected from a group consisting of at least one of: play, rewind, stop, still, continue, fast forward, and slow forward, selective picture, and picture in picture format.

20. An apparatus as in claim 19 wherein said controller is a remote controller.

21. A method for servicing a video program user being interrupted for a duration while viewing a video signal on a display, said signal having a portion corresponding to an amount of said video signal transmitted during said duration, comprising the steps of:

receiving said video signal, coupling said portion to a circular storage circuit;

storing said portion in said circular storage circuit;

commanding said portion to be displayed; and feeding said portion to said display upon receiving a command from said step of commanding.

22. A method as in claim 21 wherein:

said step of coupling further comprises the steps of input buffering and forwarding said portion to a memory circuit; and wherein said step of feeding is preceded by a step of output buffering.

23. A method as in claim 21 wherein said storage circuit comprises a memory element selected from the group of elements consisting of at least one of:

an input buffer;

a direct access storage device;

a sequential access storage device; and an output buffer.

24. A method as in claim 21 in which said storage circuit having a capacity at least equal to said amount of video signal transmitted.

25. A method as in claim 21 wherein:

said video signal comprises an entire program's video signal content; and wherein said signal portion includes said entire program's video signal content.

26. A method as in claim 21 further comprising a step selected from a group consisting of at least one of: rewinding; stopping; continuing; playing in normal forward; playing in fast forward; and playing in slow forward.

27. A method as in claim 26 wherein the step of commanding is performed remotely.

28. An apparatus having a circuit to receive and display a video signal, comprising:

at least one circular storage medium;

an input buffer coupled to said medium;

an output buffer coupled to said medium;

a storage hierarchy for storing a portion of said video signal in said medium and buffers;

a circuit for feeding said portion stored to said display; and a circuit for controlling said display, said circuit for controlling includes a video display function controller for controlling a function selected from a group consisting of at least one of: play; still; stop; rewind; continue; slow forward; fast forward; selective picture; and picture in picture format.

29. An apparatus as in claim 1 wherein said memory circuit comprises a circular storage device.

30. An apparatus as in claim 11 wherein said storage circuit further comprises a circular storage device.

31. An apparatus as in claim 1 further comprising a catchup circuit for said user to catch up with a video signal in progress.

32. A method as in claim 21 further comprising the step of catching up with said video signal in progress.

33. An apparatus as in claim 31 wherein said catchup circuit provides catchup in a form selected from the group consisting of at least one of:

picture in picture;

frame skipping; and split screen.

* * * * *

(12) EX PARTE REEXAMINATION CERTIFICATE (6638th)
United States Patent
Brodsky et al.

(10) Number: US 5,774,186 C1
(45) Certificate Issued: Feb. 3, 2009

(54) INTERRUPTION TOLERANT VIDEO PROGRAM VIEWING

(75) Inventors: Marc Herbert Brodsky, Washington, DC (US); Steven Edward Millman, Spring Valley, NY (US); Thomas Kimber Worthington, Kula, HI (US)

(73) Assignee: Echostar Technologies Corporation, Englewood, CO (US)

Reexamination Request:
No. 90/008,124, Jul. 21, 2006

Reexamination Certificate for:
Patent No.: 5,774,186
Issued: Jun. 30, 1998
Appl. No.: 08/659,125
Filed: Jun. 4, 1996

Related U.S. Application Data

(60) Provisional application No. 60/009,435, filed on Dec. 29, 1993.

(51) Int. Cl.
*H04N 5/445* (2006.01)

(52) U.S. Cl. ................. 348/553; 348/563; 348/567; 348/E5.096; 348/E5.107; 348/E5.108

(58) Field of Classification Search .................. None
See application file for complete search history.

(56) References Cited

U.S. PATENT DOCUMENTS

| | | |
|---|---|---|
| 3,682,363 A | 8/1972 | Hull |
| 3,942,190 A | 3/1976 | Detweiler |
| 4,141,039 A | 2/1979 | Yamamoto |
| 4,142,209 A | 2/1979 | Hedlund et al. |
| 4,155,889 A | 5/1979 | Fagerburg et al. |
| 4,224,481 A | 9/1980 | Russell |
| 4,258,418 A | 3/1981 | Heath |
| 4,313,135 A | 1/1982 | Cooper |
| 4,347,527 A | 8/1982 | Lainez et al. |
| 4,388,659 A | 6/1983 | Lemke |

(Continued)

FOREIGN PATENT DOCUMENTS

| | | |
|---|---|---|
| DE | 4434034 | 3/1996 |
| EP | 0265167 A3 | 4/1988 |
| EP | 0265167 A2 | 4/1988 |
| EP | 0273384 | 7/1988 |
| EP | 0487296 | 5/1992 |

(Continued)

OTHER PUBLICATIONS

Johnson, Robert et al., *DASD: IBM's Direct Access Storage Devices*, McGraw–Hill, Inc., 1992.

Johnston et al., *A Digital Television Sequence Store*, IEEE Transactions on Communications, vol. Com–26, No. 5, May 1978.

(Continued)

*Primary Examiner*—Fred Ferris

(57) ABSTRACT

Allows a video broadcast viewer to pause at anytime while viewing a program, and upon returning to be able to view the intervening segment. The video received during the pause period is stored and available for recall upon user command. The storage medium is circular in so much that the memory, upon becoming filled to capacity continues to write incoming information data over the previously stored data. The storage circuits employs a sequential access storage device and/or a direct access storage device. The storage circuit has a high speed memory input buffer and a high speed memory output buffer to account for the relatively long READ and WRITE access times of the storage device employed. At the end of the pause period, the user can view the stored video. The user has a choice between catching up to the regular broadcast or watching the remaining program video in a delay mode. The stored video may be viewed intermittently or continuously in regular, slow or fast motion, under user direct or remote VCR-type of video function control.

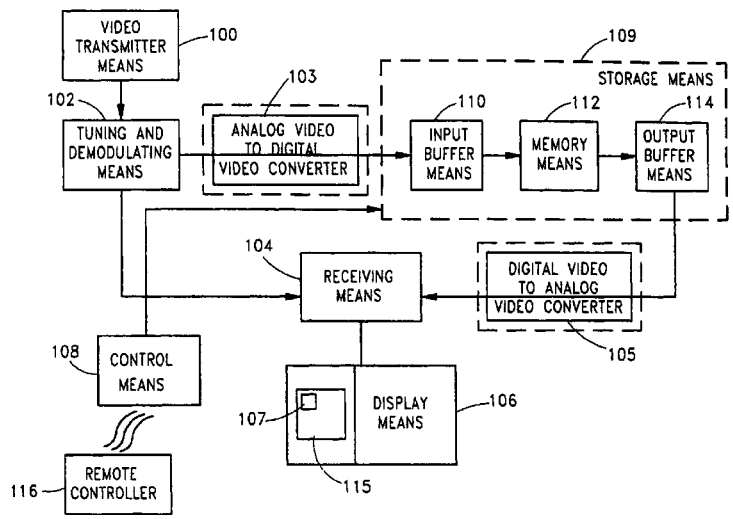

U.S. PATENT DOCUMENTS

| | | |
|---|---|---|
| 4,408,309 A | 10/1983 | Kiesling et al. |
| 4,420,828 A | 12/1983 | Yoshida et al. |
| 4,423,480 A | 12/1983 | Bauer et al. |
| 4,439,785 A | 3/1984 | Leonard |
| 4,475,132 A | 10/1984 | Rodesch |
| 4,506,348 A | 3/1985 | Miller et al. |
| 4,506,358 A | 3/1985 | Montgomery |
| 4,602,297 A | 7/1986 | Reese |
| 4,633,331 A | 12/1986 | McGrady et al. |
| 4,636,885 A | 1/1987 | Yamada et al. |
| 4,665,431 A | 5/1987 | Cooper |
| 4,688,106 A | 8/1987 | Keller et al. |
| 4,689,022 A | 8/1987 | Peers et al. |
| 4,706,121 A | 11/1987 | Young |
| 4,723,181 A | 2/1988 | Hickok |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,797,752 A | 1/1989 | Giddings |
| 4,805,217 A | 2/1989 | Morihiro et al. |
| 4,816,905 A | 3/1989 | Tweedy et al. |
| 4,821,121 A | 4/1989 | Beaulier |
| 4,833,710 A | 5/1989 | Hirashima |
| 4,876,670 A | 10/1989 | Nakabayashi et al. |
| 4,891,715 A | 1/1990 | Levy |
| 4,897,867 A | 1/1990 | Foster et al. |
| 4,899,275 A | 2/1990 | Sachs et al. |
| 4,916,682 A | 4/1990 | Tomoda et al. |
| 4,920,533 A | 4/1990 | Dufresne et al. |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,972,396 A | 11/1990 | Rafner |
| 4,979,050 A | 12/1990 | Westland et al. |
| RE33,535 E | 2/1991 | Cooper |
| 4,991,033 A | 2/1991 | Takeshita |
| 5,001,568 A | 3/1991 | Efron et al. |
| 5,014,125 A | 5/1991 | Pocock et al. |
| 5,018,186 A | 5/1991 | Kimura et al. |
| 5,019,900 A | 5/1991 | Clark et al. |
| 5,021,893 A | 6/1991 | Scheffler |
| 5,027,241 A | 6/1991 | Hatch et al. |
| 5,031,218 A | 7/1991 | Galand et al. |
| 5,043,714 A | 8/1991 | Perlman |
| 5,047,857 A | 9/1991 | Duffield et al. |
| 5,057,932 A | 10/1991 | Lang |
| 5,063,453 A | 11/1991 | Yoshimura et al. |
| 5,089,885 A | 2/1992 | Clark |
| 5,093,718 A | 3/1992 | Hoarty et al. |
| 5,109,281 A | 4/1992 | Kobori et al. |
| 5,111,345 A | 5/1992 | Muller |
| 5,113,439 A | 5/1992 | Hashimoto |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,142,532 A | 8/1992 | Adams |
| 5,148,432 A | 9/1992 | Gordon et al. |
| 5,153,726 A | 10/1992 | Billing |
| 5,168,353 A | 12/1992 | Walker |
| 5,172,413 A | 12/1992 | Bradley et al. |
| 5,191,410 A | 3/1993 | McCalley et al. |
| 5,197,051 A | 3/1993 | Tomoda et al. |
| 5,202,761 A | 4/1993 | Cooper |
| 5,208,665 A | 5/1993 | McCalley et al. |
| 5,214,768 A | 5/1993 | Martin et al. |
| 5,226,141 A | 7/1993 | Esbensen |
| 5,227,876 A | 7/1993 | Cucchi et al. |
| 5,233,423 A | 8/1993 | Jernigan et al. |
| 5,233,603 A | 8/1993 | Takeuchi et al. |
| 5,237,648 A | 8/1993 | Mills et al. |
| 5,241,428 A | 8/1993 | Goldwasser et al. |
| 5,245,430 A | 9/1993 | Nishimura |
| 5,247,347 A | 9/1993 | Litteral et al. |
| 5,251,009 A | 10/1993 | Bruno |
| 5,253,275 A | 10/1993 | Yurt et al. |
| 5,257,111 A | 10/1993 | Kakuyama |
| 5,260,800 A | 11/1993 | Sturm et al. |
| 5,283,659 A | 2/1994 | Akiyama et al. |
| 5,285,272 A | 2/1994 | Bradley et al. |
| 5,287,182 A | 2/1994 | Haskell et al. |
| 5,291,343 A | 3/1994 | Goto |
| 5,293,282 A | 3/1994 | Squires et al. |
| 5,311,423 A | 5/1994 | Clark |
| 5,317,603 A | 5/1994 | Osterweil |
| 5,317,604 A | 5/1994 | Osterweil |
| 5,329,307 A | 7/1994 | Takemura et al. |
| 5,329,320 A | 7/1994 | Yifrach |
| 5,341,474 A | 8/1994 | Gelman et al. |
| 5,355,486 A | 10/1994 | Cornaby |
| 5,357,276 A | 10/1994 | Banker et al. |
| 5,361,261 A | 11/1994 | Edem et al. |
| 5,369,533 A | 11/1994 | Ottesen et al. |
| 5,371,551 A | 12/1994 | Logan et al. |
| 5,410,676 A | 4/1995 | Huang et al. |
| 5,412,416 A | 5/1995 | Nemirofsky |
| 5,414,455 A | 5/1995 | Hooper et al. |
| 5,416,415 A | 5/1995 | Dorri et al. |
| 5,428,731 A | 6/1995 | Powers, III |
| 5,434,678 A | 7/1995 | Abecassis |
| 5,438,423 A | 8/1995 | Lynch |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,779 A | 9/1995 | Dan et al. |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,488,409 A | 1/1996 | Yuen et al. |
| 5,506,615 A | 4/1996 | Awaji et al. |
| 5,508,940 A | 4/1996 | Rossmere et al. |
| 5,513,011 A | 4/1996 | Matsumoto et al. |
| 5,513,306 A | 4/1996 | Mills et al. |
| 5,517,250 A | 5/1996 | Hoogenboom et al. |
| 5,517,652 A | 5/1996 | Miyamoto et al. |
| 5,519,684 A | 5/1996 | Iizuka et al. |
| 5,521,630 A | 5/1996 | Chen et al. |
| 5,526,202 A | 6/1996 | Blagaila et al. |
| 5,528,281 A | 6/1996 | Grady et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,414 A | 7/1996 | Burge |
| 5,537,157 A | 7/1996 | Washino et al. |
| 5,537,408 A | 7/1996 | Branstad et al. |
| 5,539,871 A | 7/1996 | Gibson |
| 5,541,919 A | 7/1996 | Young et al. |
| 5,550,594 A | 8/1996 | Cooper et al. |
| 5,550,982 A | 8/1996 | Long et al. |
| 5,555,441 A | 9/1996 | Haddad |
| 5,555,463 A | 9/1996 | Staron et al. |

| | | | | | | |
|---|---|---|---|---|---|---|
| 5,557,538 A | 9/1996 | Retter et al. | | 5,930,493 A | 7/1999 | Ottesen et al. |
| 5,557,541 A | 9/1996 | Schulhof et al. | | 5,949,948 A | 9/1999 | Krause et al. |
| 5,559,999 A | 9/1996 | Maturi et al. | | 5,949,954 A | 9/1999 | Young et al. |
| 5,563,714 A | 10/1996 | Inoue et al. | | 5,956,716 A | 9/1999 | Kenner et al. |
| 5,572,261 A | 11/1996 | Cooper | | 5,963,202 A | 10/1999 | Polish |
| 5,574,662 A | 11/1996 | Windrem et al. | | 5,973,679 A | 10/1999 | Abbott et al. |
| 5,577,190 A | 11/1996 | Peters | | 5,991,496 A | 11/1999 | Kojima |
| 5,581,310 A | 12/1996 | Vinekar et al. | | 5,995,709 A | 11/1999 | Tsuge |
| 5,581,479 A | 12/1996 | McLaughlin et al. | | 5,999,691 A | 12/1999 | Takagi et al. |
| 5,583,561 A | 12/1996 | Baker et al. | | 6,002,832 A | 12/1999 | Yoneda |
| 5,583,652 A | 12/1996 | Ware | | 6,005,562 A | 12/1999 | Shiga et al. |
| 5,586,264 A | 12/1996 | Belknap et al. | | 6,005,564 A | 12/1999 | Ahmad et al. |
| 5,594,924 A | 1/1997 | Ottesen et al. | | 6,018,612 A | 1/2000 | Thomason et al. |
| 5,600,364 A | 2/1997 | Hendricks et al. | | 6,028,599 A | 2/2000 | Yuen et al. |
| 5,603,058 A | 2/1997 | Belknap et al. | | RE36,801 E | 8/2000 | Logan et al. |
| 5,604,544 A | 2/1997 | Bertram | | 6,112,226 A | 8/2000 | Weaver et al. |
| 5,610,653 A | 3/1997 | Abecassis | | 6,138,147 A | 10/2000 | Weaver et al. |
| 5,612,953 A | 3/1997 | Olnowich | | 6,141,385 A | 10/2000 | Yamaji et al. |
| 5,614,940 A | 3/1997 | Cobbley et al. | | 6,151,059 A | 11/2000 | Schein et al. |
| 5,615,401 A | 3/1997 | Harscoet et al. | | 6,154,771 A | 11/2000 | Rangan et al. |
| 5,619,247 A | 4/1997 | Russo | | 6,163,644 A | 12/2000 | Owashi et al. |
| 5,619,337 A | 4/1997 | Naimpally | | 6,167,083 A | 12/2000 | Sporer et al. |
| 5,625,464 A | 4/1997 | Compoint et al. | | 6,169,843 B1 | 1/2001 | Lenihan et al. |
| 5,627,695 A | 5/1997 | Prins et al. | | 6,192,189 B1 | 2/2001 | Fujinami et al. |
| 5,629,732 A | 5/1997 | Moskowitz et al. | | 6,198,877 B1 | 3/2001 | Kawamura et al. |
| 5,630,067 A | 5/1997 | Kindell et al. | | 6,208,804 B1 | 3/2001 | Ottesen et al. |
| 5,630,104 A | 5/1997 | Ottesen et al. | | 6,226,447 B1 | 5/2001 | Sasaki et al. |
| 5,642,171 A | 6/1997 | Baumgartner et al. | | 6,229,532 B1 | 5/2001 | Fujii |
| 5,648,824 A | 7/1997 | Dunn | | 6,233,389 B1 | 5/2001 | Barton et al. |
| 5,659,539 A | 8/1997 | Porter et al. | | 6,243,741 B1 | 6/2001 | Utsumi |
| 5,664,044 A | 9/1997 | Ware | | 6,249,641 B1 | 6/2001 | Yokota |
| 5,668,948 A | 9/1997 | Belknap et al. | | 6,253,375 B1 | 6/2001 | Gordon et al. |
| 5,675,388 A | 10/1997 | Cooper | | 6,256,704 B1 | 7/2001 | Hlava et al. |
| 5,696,866 A | 12/1997 | Iggulden et al. | | 6,272,672 B1 | 8/2001 | Conway |
| 5,696,868 A | 12/1997 | Kim et al. | | 6,278,837 B1 | 8/2001 | Yasukohchi et al. |
| 5,701,383 A | 12/1997 | Russo et al. | | 6,285,824 B1 | 9/2001 | Yanagihara et al. |
| 5,706,388 A | 1/1998 | Isaka | | 6,292,618 B1 | 9/2001 | Ohara et al. |
| 5,712,976 A | 1/1998 | Falcon, Jr. et al. | | 6,292,619 B1 | 9/2001 | Fujita et al. |
| 5,715,356 A | 2/1998 | Hirayama et al. | | 6,301,711 B1 | 10/2001 | Nusbickel |
| 5,719,982 A | 2/1998 | Kawamura et al. | | 6,304,714 B1 | 10/2001 | Krause et al. |
| 5,721,585 A | 2/1998 | Keast et al. | | 6,330,675 B1 | 12/2001 | Wiser et al. |
| 5,721,815 A | 2/1998 | Ottesen et al. | | 6,341,195 B1 | 1/2002 | Mankovitz et al. |
| 5,721,878 A | 2/1998 | Ottesen et al. | | 6,353,461 B1 | 3/2002 | Shore et al. |
| 5,724,474 A | 3/1998 | Oguro et al. | | 6,400,407 B1 | 6/2002 | Zigmond et al. |
| 5,729,741 A | 3/1998 | Liaguno et al. | | 6,424,791 B1 | 7/2002 | Saib |
| 5,751,282 A | 5/1998 | Girard et al. | | 6,445,738 B1 | 9/2002 | Zdepski et al. |
| 5,751,338 A | 5/1998 | Ludwig, Jr. | | 6,445,872 B1 | 9/2002 | Sano et al. |
| 5,751,371 A | 5/1998 | Shintani | | 6,498,894 B2 | 12/2002 | Ito et al. |
| 5,751,883 A | 5/1998 | Ottesen et al. | | 6,504,990 B1 | 1/2003 | Abecassis |
| 5,754,254 A | 5/1998 | Kobayashi et al. | | 6,516,467 B1 | 2/2003 | Schindler et al. |
| 5,761,166 A | 6/1998 | Sedlmayr et al. | | 6,529,685 B2 | 3/2003 | Ottesen et al. |
| 5,761,417 A | 6/1998 | Henley et al. | | 6,542,695 B1 | 4/2003 | Akiba et al. |
| 5,771,334 A | 6/1998 | Yamauchi et al. | | 6,553,178 B2 | 4/2003 | Abecassis |
| 5,774,170 A | 6/1998 | Hite et al. | | 6,698,020 B1 | 2/2004 | Zigmond et al. |
| 5,774,186 A | 6/1998 | Brodsky et al. | | 6,754,254 B2 | 6/2004 | Sendonaris |
| 5,778,137 A | 7/1998 | Nielsen et al. | | 6,788,882 B1 | 9/2004 | Geer et al. |
| 5,787,225 A | 7/1998 | Honjo | | 7,055,166 B1 | 5/2006 | Logan et al. |
| 5,805,763 A | 9/1998 | Lawler et al. | | 7,272,298 B1 | 9/2007 | Lang et al. |
| 5,805,821 A | 9/1998 | Saxena et al. | | 2005/0025469 A1 | 2/2005 | Geer et al. |
| 5,808,607 A | 9/1998 | Brady et al. | | 2005/0132418 A1 | 6/2005 | Barton et al. |
| 5,815,689 A | 9/1998 | Shaw et al. | | 2005/0226604 A1 | 10/2005 | Kawamura et al. |
| 5,822,493 A | 10/1998 | Uehara et al. | | | | |
| 5,852,705 A | 12/1998 | Hanko et al. | | | | |
| 5,864,682 A | 1/1999 | Porter et al. | | | | |
| 5,870,553 A | 2/1999 | Shaw et al. | | | | |
| 5,889,915 A | 3/1999 | Hewton | | | | |
| 5,892,884 A | 4/1999 | Sugiyama et al. | | | | |
| 5,899,578 A | 5/1999 | Yanagihara et al. | | | | |
| 5,920,572 A | 7/1999 | Washington et al. | | | | |
| 5,920,842 A | 7/1999 | Cooper et al. | | | | |
| 5,930,444 A | 7/1999 | Camhi et al. | | | | |

FOREIGN PATENT DOCUMENTS

| | | |
|---|---|---|
| EP | 0521454 | 1/1993 |
| EP | 594241 A1 | 4/1994 |
| EP | 0594241 A1 | 4/1994 |
| EP | 0599765 | 6/1994 |
| EP | 0625858 | 11/1994 |
| EP | 0630006 | 12/1994 |
| EP | 0643388 | 3/1995 |
| EP | 0645929 | 3/1995 |

| | | |
|---|---|---|
| EP | 0701245 | 3/1996 |
| EP | 0726574 | 8/1996 |
| EP | 0785675 | 7/1997 |
| EP | 0817483 | 1/1998 |
| GB | 2222742 A | 3/1990 |
| GB | 2320637 | 6/1998 |
| JP | 63-161532 | 7/1988 |
| JP | 02-103732 | 4/1990 |
| JP | 04-088772 | 3/1992 |
| JP | 04-170756 | 6/1992 |
| JP | 06-233234 | 8/1994 |
| JP | 06-245157 A | 9/1994 |
| JP | 6-245157 | 9/1994 |
| JP | 7-111629 | 4/1995 |
| JP | 07-111629 A | 4/1995 |
| JP | 07-131754 | 5/1995 |
| JP | 7-250305 | 9/1995 |
| JP | 07-250305 | 10/1995 |
| JP | 07-264529 A | 10/1995 |
| JP | 7-264529 | 10/1995 |
| WO | WO-91/03112 | 3/1991 |
| WO | WO 92/22983 A2 | 12/1992 |
| WO | WO-95/09509 | 4/1995 |
| WO | WO-95/32584 | 11/1995 |
| WO | WO-98/56188 | 12/1998 |
| WO | WO-00/76130 | 12/2000 |

OTHER PUBLICATIONS

Woodham, D.J., *A Solid State "Action Replay" Recorder*, Symposium Record Broadcast Sessions, 16th International TV Symposium, Montreaux, Switzerland, Jun. 17–22, 1989.

S. Berson et al., "Staggered Striping in Multimedia Information Systems", University of California Computer Science department Technical Report CSD–930042, Dec. 1993.

S. Berson et al., "Design of a Scalable Multimedia Storage Manager", UCLA Technical Report 94003, Jun. 1994.

Connor Filepro Performance Series CFP1060E/CFP1060S/CFP1060W Intelligent Disk Drive Product Manual, Rev. A, May 1994, Conner Peripherals.

I. Freedman et al., "Systems Aspects of COBE Science Data Compression", in 1993 Space and Earth Science Data Compression Workshop held at Snowbird, Utah, Apr. 2, 1993, pp. 85–97, NASA Conference Publication 3191.

And Earth Science Data Compression Workshop held at Snowbird, Utah, Apr. 2, 1993, pp. 85–97, NASA Conference Publication 3191.

Douglas T. Anderson, "The Hard Disk Technical Guide", Rev. Feb. 1994, Micro House.

Winston Hodge et al., "True Video on Demand v. Near Video on Demand in Interactive Television", pp. 103–120, McGraw–Hill: IBN 0–07–29151–9, National Cable Television Conference, May 24, 1995.

A. Hospodor, "The Effect of Prefetch on Caching SCSI Disk Drive Buffers", Doctoral Thesis, Santa Clara University, May 1994.

OEM Interface Specification for DSAA–3xxx(281/365/548(528MB)/730MB 3.5–inch Hard Disk Drive with ATA Interface, IBM Specification S84G–8402–00, IBM Rev. 1.0, Feb. 23, 1994.

IBM, 0663 and 0663 Enhanced Disk Drive SCSI Specification Release 4.0, IBM Specification 41W–0000–001, IBM, Sep. 18, 1992.

Apple Computer, "Inside MacIntosh: Overview", Addison–Wesley Publishing Co., 1992.

Neil McManes, "QuickTime Ready for Prime Time", Macweek, vol. 5, No. 42, Dec. 13, 1991.

Cyril U. Orji et al., "Design and Configuration Rationales for Digital Video Storage and Delivery Systems", Multimedia Tools & Applications 9:275–302(1992).

Quantum Fireball 640/1280S Product Manual, Quantum Corp., 1995.

Guide to VAX/VMS File Applications, Digital Equipment Corporation Massachusetts, Sep. 1984 (selected pages).

Harrick M. Vin et al., "Designing a Multiuser HDTV Storage Server", IEEE Journal on Selected Areas in Communication, 11(1): 153–164, Jan. 1993.

J. M. Harker et al., A Quarter Century of Disk File Innovation, IBM Journal of Research and Development, vol. 25, No. 5:678, 652–685, Sep. 1981.

Advertisements by Quantum Corporation for Q500, 2000 and 2080 series.

Chris Ruemmler and John Wilkes, "UNIX disk access patterns," Hewlett–Packard Laboratories, Winter USENIX, San Diego, CA, Jan. 25–29, 1993.

Hugh Sierra, "An Introduction to Direct Access Storage Devices," Academic Press, 1990.

"Conner Peripherals Unveils Dual Actuator Storage Device," Dow Jones Newswires, Oct. 22, 1991.

John R. Quain, "Continuing Forecast: Faster, Smaller; Forecast for the Hard Disk Drive Industry," Computer Shopper, May 1992, vol. 12, No. 5, p. 542, Ziff Davis Publishing.

Stan Miastkowski, "Speed Data Delivery," Byte, Dec. 1994.

"Seagate Expands Support for Professional Audio/Video System Storage Applications," Business Wire, Apr. 5, 1995.

"Model DFMS–351AV," copyrighted 1995.

"Addendum to Functional Specification Ultrastar (DFMS) SCSI Models," IBM, May 18, 1995.

"Seagate Introduces 23–Gbyte Elite Disc Drive," Business Wire, Feb. 26, 1996.

T.–G. Kwon and S. Lee, "PRR: Prime Round–Robin Placement for Implementing VCR Operations," IEEE International Conference on Systems, 1995, vol. 5, pp. 3920–3925.

Greg Varana, "If I only had a drive," EDN, Sep. 13, 2001, pp. 31–40.

"Correctable Disk Errors and Audio/Video Applications," SCSI Toolbox, LLC, web page, Apr. 17, 2006.

"Audio/Video Drives FAQ," Seagate website page, copyrighted 2006.

"Audio/Video FAQ," Seagate website page, copyrighted 2006.

IBM, Models DFHS–31080, –32160, and –34320 Disk Drive Specifications, Nov. 1993.

IBM, Models DFMS–31080, –32160, –32600, –34320, and –35250 Disk Drive Specifications, Nov. 1993.

Quantum, Empire Models 1440S, 21605 Disk Drive Specifications, 1993.

IBM, 0662 Model MO Disk Drive Specification, Nov. 1993.

Seagate, Product Overview, Mar. 1994.

IBM, 0662 Models S12, S1D, SW1 and SWD Disk Drive Specifications, Nov. 1993.

Fujitsu, Models M2903, M2909, and M2915 Disk Drive Specifications, 1993.

IBM, 0664 Models M1 H and N1H Disk Drive Specifications, Nov. 1992.

Quantum, Empire Models 540S and 1080S Disk Drive Specifications, 1993.

Seagate, Barracuda Family Disk Drive Specifications, 1992.

IBM, Models DPEA–31080 and DPES–31080 Disk Drive Specifications, Oct. 1994.

Conner Peripherals, Inc., Filepro Performance 4207 Series Disk Drive Specification, May 1994.

Seagate, ST12400 Family Disk Drive Specifications, 1992.

Connor Peripherals, Inc., Aegean Series Disk Drive Specifications, Jun. 1992.

IBM, Model DSAA–3270, –3360, –3540, –3720; and DSAS–3270, –3360, –3540, –3720. Disk Drive Specifications, Nov. 1993.

IBM, 0663 Models E15 and E12 Disk Drive Specifications, Aug. 1992.

Conner Peripherals, Inc., Baja Series Disk Drive Specifications, Jun. 1992.

Conner Peripherals, Inc., Summit Series Disk Drive Specifications, Oct. 1991.

Seagate, Hawk 2XL Disk Drive Specifications, 1995.

MPEG International Standard, ISO/IEC 11172–1 (1993).

SCSI–2 Specification, Revision 10L, Sep. 1993 (excerpts).

Yamamoto et al., High Areal Bit Density Perpendicular Magnetic Recording on Hard Disk, IEEE Transactions on Magnetics, vol. 27, No. 6, Nov. 1991.

Arnett et al., TMR and Squeeze at Gigabit Areal Densities, IEEE Transactions on Magnetics, vol. 28, No. 4, Jul. 1992.

1993 Disk/Trend Report on Rigid Disk Drives (excerpts).

1995 Disk/Trend Report on Rigid Disk Drives (excerpts).

IBM Technical Disclosure Bulletin, Multimedia Extensions to Tutorial Manager for Officevision, vol. 33, No. 3, Jul. 1990, p. 440.

IBM Technical Disclosure Bulletin, Interactive Computer/Video Server, vol. 34, No. 3, Aug. 1991, pp. 67–68.

IBM Technical Disclosure Bulletin, Automatic Multiple Source Selection in a Video Conference, vol. 34, No. 7A, Dec. 1991, pp. 385–386.

IBM Technical Disclosure Bulletin, Multimedia Bitmap Video Imaging in an OS/2 Window, vol. 34, No. 7A, Dec. 1991, pp. 402–403.

IBM Technical Disclosure Bulletin, Multimedia Network System, vol. 35, No. 4B, Sep. 1992, pp. 118–119.

IBM Technical Disclosure Bulletin, Spiral Direct Access Storage Device Format for Non–Stop Multimedia Data Transfers, vol. 37, No. 8, Aug. 1994, pp. 7–8.

Electronic Engineering Times, Rich Boyd–Merritt, Video–On–Demand Battle Brewing, Oct. 4, 1993, pp. 113–114.

Electronic Engineering Times, Rich Boyd–Merritt, Redesigned Disk Drives Go To The Movies, Jan. 17, 1994, pp. 37, 39–40, 53.

P. Lougher et al., "The Impact of Digital Audio and Video on High–Speed Storage," *Thirteenth IEEE Symposium on Mass Storage Systems*, 1994, pp. 84–89.

W.D. Sincoskie, System Architecture for a Large Scale Video on Demand Service, *Computer Networks and ISDN Systems*, vol. 22, pp. 155–162 (1991).

H. Taylor et al., "The Magic Video–on–Demand Server and Real–Time Simulation System," *IEEE Parallel & Distributed Technology*, pp. 40–51 (1995).

Documents regarding European Patent Application No. 96480069.2: letter to European Patent Office dated Jun. 6, 2008 submitting response (2 pp); set of amended European claims submitted with Jun. 6, 2008 response (5 pp); and receipt for European Patent Office acknowledging receipt of Jun. 6, 2008 response to official action (1 pg.).

European search report dated Apr. 25, 2006 for European Pat. Appln. No. 96480074.2.

European examination report dated Jan. 8, 2007 for European Pat. Appln. No. 96480074.2.

Documents regarding European Patent Application No. 96480074.2: letter to European Patent Office dated Jun. 2, 2008 responding to official action (2 pp); clean set of amended claims (6 pp); amended claims with track changes (6 pp); and Acknowledgement of receipt from European Patent Office (1 pg.).

Oyang, et al., "Design of Multimedia Storage Systems for On–Demand Playback," Proceedings of the International Conference on Data Engineering, Taipei, Mar. 6–10, 1995, vol. CONF 11, pp. 457–465.

European Search Report for EP Application No. 96480069, dated Dec. 30, 2005.

European Office Action for EP Application No. 96480074, dated Sep. 21, 2007.

European Office Action for EP Application No. 96480069, dated Nov. 27, 2007.

European Examination Report dated Aug. 8, 2008 for European Patent No. 96480074.2.

V Fujii et al., "Implementation of MPEG Transport Demultiplexer with a RISC–Based Microcontroller," IEEE, 1996.

M. Hausdorfer, "Symposium Record Broadcast Sessions", HDTV Production: Today and Tomorrow, Jun. 17, 1989, (7 pgs.).

J. Meng et al., "CVEPS—A Compressed Video Editing and Parsing System," ACM Multimedia '96, Boston MA, pp. 43–53 (ACM 0–89791–671–1/96/1).

Ramanathan et al., "Toward Personalized Multimedia Dial–Up Services", Computer Networks and ISDN Systems Jul. 26, 1994, No. 10, Amsterdam, NL.

K. Shen et al., A Fast Algorithm for Video Parsing Using MPEG Compressed Sequences, IEEE, 252–5.

S. Smoliar et al., Content–Based Video Indexing and Retrieval, IEEE, Summer 1994, pp. 62–72.

J. Stratigos et al., Medi4 Press Release "Announces Reseller Agreement with AlphaStar Television Networks", Microsoft® and Windows® 95 (2 pgs).

J. Stratigos et al., Media4 Press Release "Announces Multimedia Satellite Network for Personal Computers", Microsoft® 95 (2 pgs).

H. Zhang, "Video Parsing, Retrieval and Browsing: An Integrated and Content–Based Solution," ACM Multimedia 95, Electronic Proceedings, Nov. 5–9, 1995, 16 pages.

Astarte DVDirector™. Beta Testing Program.

DiviCom, MP100 User Guide, DiviCom, Inc., © 1996 (97 pgs).

Hewlett Packard® MPEGscope Startup Guide, Hewlett Packard Company © 1997–2000 (39 pgs).

IBM Documents labeled IBM 000841 to IBM 000853, 1993.

International Standard ISO/IEC 11172–2: 1993(E), (Part 2: Video), Downloaded Jun. 15, 2005 124 pp.

International Standard ISO/IEC 11172–3:1993/Cor. 1:1996(E), (Part 3: Audio), Downloaded Jun. 15, 2005—2 pages.

International Standard ISO/IEC 13818–1:2000(E) "Information Technology—Generic Coding of Moving Pictures and Associated Audio Information: Systems", © ISO/IEC 2000, Downloaded Jun. 30, 2005, 174 pp.

International Standard ISO/IEC 13818–2:2000(E)"Information Technology—Generic Coding of Moving Pictures and Associated Audio Information: Video", © ISO/IEC 2000, Downloaded Jun. 30, 2005, 220 pp.

International Standard ISO/IEC 13818–3:1998(E) "Information Technology—Generic Coding of Moving Pictures and Associated Audio Information: Audio", © ISO/IEC 1998 (126 pp).

International Standard ISO/IEC 13818–1:2000/Amd.2:2004(E) "Information Technology—Generic Coding of Moving Pictures and Associated Audio Information: Systems", Amendment 2: Support of IPMP on MPEG–2 Systems, © ISO/IEC 2004, Downloaded Jun. 30, 2005, 13 pages.

MediaStream by Media4, "Desktop Satellite Multimedia", "The MediaStream Receiver Card", "MediaStream Uplink System", by Media4, Inc.

Media Stream, "Satellite Receiver" Installation and Users Guide for Windows 95, Media4, Inc., © 1996.

SCSI Specification, 0663 and 0663 Enhanced Disk Drive, Release 4.0, (247pgs).

IBM, 0662 Model A10 Disk Drive Specification, Nov. 1993.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 31–33 are cancelled.

Claims 1, 11, 21 and 28 are determined to be patentable as amended.

Claims 2–10, 12–20, 22–27 and 29–30, dependent on an amended claim, are determined to be patentable.

New claims 34–37 are added and determined to be patentable.

1. A video signal viewing apparatus having a receiver circuit, a user command circuit coupled to said receiver circuit, and a display means coupled to said receiver circuit, said apparatus further comprising:
   an input buffer circuit coupled to said receiver circuit and having an input for receiving and buffering a portion of a signal, and an input buffer output;
   a memory circuit coupled to said input buffer output for storing said portion, and having a memory output; [and]
   an output buffer circuit having an output buffer input coupled to said memory output for receiving and buffering said memory output, and an output buffer output; *and*
   *a catch up circuit for said user to catch up with a video signal in progress, said catch up circuit provides catch up by skipping preset by a user programmable amount;* and wherein
   said command circuit causes said output buffer output to be coupled to said receiver circuit for feeding said portion for display on said display means upon receiving a command from a user input.

11. A user command controlled apparatus receiving a video signal comprising:
    a video input circuit for receiving said video signal and having a video output;
    a receiving circuit having a first receiver input coupled to said video output for receiving said video signal, a second receiver input and a receiver output;
    a display means having a display input coupled to said receiver output for receiving and displaying said video signal;
    a storage circuit having a storage input coupled to said video output, and a storage output, said storage circuit receiving and storing a portion of said video signal; [and]
    a control circuit responsive to a user command coupled to said storage circuit and causing said storage output to be coupled to said second receiver input for feeding said portion for display on said display means when so commanded by a user; *and*
    *a catch up circuit for said user to catch up with a video signal in progress, said catch up circuit provides catch up by skipping preset by a user programmable amount.*

21. A method for servicing a video program user being interrupted for a duration while viewing a video signal on a display, said signal having a portion corresponding to an amount of said video signal transmitted during said duration, comprising the steps of:
    receiving said video signal,
    coupling said portion to a circular storage circuit;
    storing said portion in said circular storage circuit;
    commanding said portion to be displayed; [and]
    feeding said portion to said display upon receiving a command from said step of commanding; *and*
    *catching up with said video signal in progress by skipping preset by a user programmable amount.*

28. An apparatus having a circuit to receive and display a video signal, comprising:
    at least one circular storage medium;
    an input buffer coupled to said medium;
    an output buffer coupled to said medium;
    a storage hierarchy for storing a portion of said video signal in said medium and buffers;
    a circuit for feeding said portion stored to said display; [and]
    a circuit for controlling said display, said circuit for controlling includes a video display function controller for controlling a function selected from a group consisting of at least one of: play; still; stop; rewind; continue; slow forward; fast forward; selective picture; and picture in picture format; *and*
    *a catch up circuit for a user to catch up with a video signal in progress, said catch up circuit provides catch up by skipping preset by a user programmable amount.*

*34. The video signal viewing apparatus of claim 1 wherein said catch up circuit provides catch up by discarding video frames based on a frame discard rate set by said user.*

*35. The apparatus of claim 11 wherein said catch up circuit provides catch up by discarding video frames based on a frame discard rate set by said user.*

*36. The method of claim 21 wherein said step of catching up comprises discarding video frames based on a frame discard rate set by said user.*

*37. The apparatus of claim 28 wherein said catch up circuit provides catch up by discarding video frames based on a frame discard rate set by said user.*

* * * * *

(12) EX PARTE REEXAMINATION CERTIFICATE (7869th)

United States Patent
Brodsky et al.

(10) Number: US 5,774,186 C2
(45) Certificate Issued: Nov. 9, 2010

(54) INTERRUPTION TOLERANT VIDEO PROGRAM VIEWING

(75) Inventors: Marc Herbert Brodsky, Washington, DC (US); Steven Edward Millman, Spring Valley, NY (US); Thomas Kimber Worthington, Kula, HI (US)

(73) Assignee: Echostar Technologies L.L.C., Englewood, CO (US)

Reexamination Request:
No. 90/009,465, Jun. 29, 2009

Reexamination Certificate for:
Patent No.: 5,774,186
Issued: Feb. 3, 2009
Appl. No.: 08/659,125
Filed: Jun. 4, 1996

Reexamination Certificate B1 5,774,186 issued Jun. 30, 1998

Related U.S. Application Data
(60) Provisional application No. 60/009,435, filed on Dec. 29, 1995.

(51) Int. Cl.
*H04N 5/44* (2006.01)

(52) U.S. Cl. .................. 348/553; 348/563; 348/567; 348/E5.096; 348/E5.108

(58) Field of Classification Search ............... None
See application file for complete search history.

(56) References Cited

U.S. PATENT DOCUMENTS

| | | | |
|---|---|---|---|
| 4,221,176 A | 9/1980 | Besore et al. | |
| 4,566,034 A | 1/1986 | Harger et al. | |
| 4,752,834 A | 6/1988 | Koombes | |
| 4,879,050 A | 11/1989 | Yamaguchi et al. | |
| 4,884,197 A | 11/1989 | Sachs et al. | |
| 4,924,387 A | 5/1990 | Jeppesen | |
| 4,959,810 A | 9/1990 | Darbee et al. | |
| 5,027,400 A | 6/1991 | Baji et al. | |
| 5,118,105 A | 6/1992 | Brim et al. | |
| 5,371,551 A | 12/1994 | Logan et al. | |

(Continued)

FOREIGN PATENT DOCUMENTS

| | | |
|---|---|---|
| CA | 2137745 C | 7/2004 |
| CN | 1189045 A | 7/1998 |
| EP | 0 594 241 A1 | 4/1994 |
| EP | 0 651 328 A1 | 5/1995 |
| EP | 0701246 | 3/1996 |

(Continued)

OTHER PUBLICATIONS

Hanna, C. et al., "Demultiplexer IC for MPEG2 Transport Streams," *IEEE Transactions on Consumer Electronics.* vol. 41, No. 3, pp. 699–709 (Aug. 1995).

(Continued)

*Primary Examiner*—Christopher E Lee

(57) ABSTRACT

Allows a video broadcast viewer to pause at anytime while viewing a program, and upon returning to be able to view the intervening segment. The video received during the pause period is stored and available for recall upon user command. The storage medium is circular in so much that the memory, upon becoming filled to capacity continues to write incoming information data over the previously stored data. The storage circuits employs a sequential access storage device and/or a direct access storage device. The storage circuit has a high speed memory input buffer and a high speed memory output buffer to account for the relatively long READ and WRITE access times of the storage device employed. At the end of the pause period, the user can view the stored video. The user has a choice between catching up to the regular broadcast or watching the remaining program video in a delay mode. The stored video may be viewed intermittently or continuously in regular, slow or fast motion, under user direct or remote VCR-type of video function control.

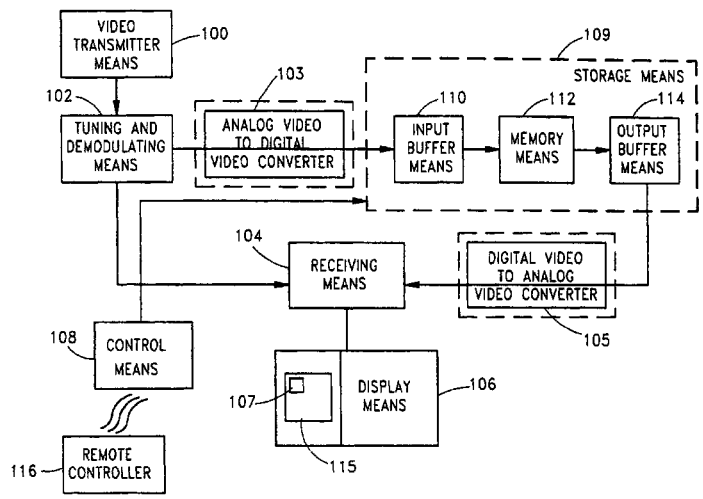

U.S. PATENT DOCUMENTS

| | | | |
|---|---|---|---|
| 5,388,264 | A | 2/1995 | Tobias, II et al. |
| 5,438,423 | A | 8/1995 | Lynch et al. |
| 5,442,390 | A | 8/1995 | Hooper et al. |
| 5,475,498 | A | 12/1995 | Radice |
| 5,535,008 | A | 7/1996 | Yamagishi et al. |
| 5,596,581 | A | 1/1997 | Saejs et al. |
| 5,598,352 | A | 1/1997 | Rosenau et al. |
| 5,600,379 | A | 2/1997 | Wagner |
| 5,612,749 | A | 3/1997 | Bacher et al. |
| 5,635,984 | A | 6/1997 | Lee |
| 5,659,539 | A | 8/1997 | Porter et al. |
| 5,701,383 | A | 12/1997 | Russo et al. |
| 5,703,655 | A | 12/1997 | Corey et al. |
| 5,729,280 | A | 3/1998 | Inoue et al. |
| 5,796,695 | A | 8/1998 | Tsutsui |
| 5,832,085 | A | 11/1998 | Inoue et al. |
| 5,862,342 | A | 1/1999 | Winter et al. |
| 5,898,695 | A | 4/1999 | Fujii et al. |
| 5,909,257 | A | 6/1999 | Ohishi et al. |
| 5,949,948 | A | 9/1999 | Krause et al. |
| 6,018,612 | A | 1/2000 | Thomason et al. |
| 6,263,396 | B1 | 7/2001 | Cottle et al. |
| 6,282,209 | B1 | 8/2001 | Kataoka et al. |
| 6,359,636 | B1 | 3/2002 | Schindler et al. |
| 6,363,212 | B1 | 3/2002 | Fujinami et al. |
| 6,480,667 | B1 | 11/2002 | O'Connor |
| 6,546,556 | B1 | 4/2003 | Kataoka et al. |
| 2005/0122335 | A1 | 6/2005 | MacInnis et al. |
| 2008/0288998 | A1 | 11/2008 | Locket et al. |

FOREIGN PATENT DOCUMENTS

| | | | |
|---|---|---|---|
| EP | 0 762 756 | A2 | 3/1997 |
| EP | 0 766 476 | A2 | 4/2007 |
| GB | 2 286 282 | | 8/1995 |
| GB | 2333017 | A | 7/1999 |
| JP | 06-245157 | A | 9/1994 |
| JP | 07-044907 | A | 2/1995 |
| JP | 08-279273 | | 10/1996 |
| JP | 10-056620 | A | 2/1998 |
| JP | 11-203135 | A | 7/1999 |
| JP | 2000-295560 | A | 10/2000 |
| WO | WO-93/16557 | A1 | 8/1993 |
| WO | WO-94/17626 | A1 | 8/1994 |
| WO | WO-95/33336 | A1 | 12/1995 |
| WO | WO-98/48566 | A2 | 10/1998 |
| WO | WO-00/33568 | A1 | 6/2000 |
| WO | WO-03/019932 | A1 | 3/2003 |

OTHER PUBLICATIONS

Ceccarelli, M. et al., "A Sequence Analysis System For Video Databases", Time–Varying Image Processing and Moving Object Recognition, 4, Elsevier Science B.V., pp. 133–138, 1997.

Chatterjee, Amit et al., "Microsoft Direcshow: A new Media Architecture", SMPTE Journal, pp. 865–871, Dec. 1997.

DMA, published in Embedded Systems Programming, 4 pages, Oct. 1994.

Fung, Chi–Leung et al., "MOCS: an Object–Oriented Programming Model for Multimedia Object Communication and Synchronization", Department of Computer Science, The Hong Kong University of Science and Technology, Clear Water Bay, Kowloon, Hong Kong, 1997 IEEE.

Hanjalic et al., "Automation of Systems Enabling Search on Stored Video Data", SPIE/IS&T Electronic Imaging '97, vol. 3022, pp. 427–438, Jan. 15, 1997.

Hewlett Packard® MPEGscope User's Guide, Hewlett Packard Company © 1997–2000, 286 pp.

Inside Macintosh "Files," Apple Technology Library by Apple Computer, Inc., © 1992 (published by Addison Wesley Publishing Company) 539 pp.

Inside MacIntosh "Memory", Apple Technology Library by Apple Computer, Inc., © 1992 (published by Addison–Wesley Publishing Company) 303 pp.

Inside MacIntosh "QuickTime", Apple Technology Library by Apple Computer, Inc., © 1993 (published by Addison–Wesley Publishing Company) 740 pp.

Inside MacIntosh "QuickTime Components", Apple Technology Library by Apple Computer, Inc., © 1993 (published by Addison–Wesley Publishing Company) 831 pp.

Leek, Matthew R., et al., "MPEG Q&A (Moving Pictures Expert Group Digital Video Compression Standard)"; CD–ROM Professional, v7, n4, p41, Jul.–Aug. 1994.

Mayer–Patel, Ketan et al., "Synchronized Continuous Media Playback Through the World Wide Web", U.C. Berkeley, Computer Science Division, Berkeley Multimedia Research Center, Published: 1996, Berkeley, CA.

McLarnon, Zed, et al., "Digital Image Meets Digital Audio; Sync Problems Faced by Multimedia PRoducer Now", Advanced Imaging, v9, n1, p62, Jan. 1994.

Nelson, Lee J., "The Latest in Compression Hardware & Software (Product Survey)", Advanced Imaging, v9, n1, p56, Jan. 1994.

"New Graphic Enhancements Will be on Display at NAB (National Association of Broadcasters Exhibition", Broadcasting, v118, n11, p57, Mar. 12, 1990.

"Next Video Recorder—Tape or Disc?", Consumer Electronics, v33, n8, Feb. 22, 1993.

Peuker, Thomas, "An Ogject–Oriented Architecture for the Real–Time Transmission of Multimedia Data Streams", Institute fur Mathematische Maschinen und Datenverarbeitung (Informatik) IV, Lehrstul fur Betriebssysteme Universitat Erlangen–Nrnberg, Erlangen, Mar. 17, 1997.

MPEG Standard, MPEG International Standard, ISO/IEC 11172–2 (Video), Aug. 1, 1993 (Exhibit 6).

Miastkowski, Stan, Speed Data Delivery, BYTE, pp. 187–188, Dec. 1994 (Exhibit 14).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3, 11-20 and 35 is confirmed.
Claims 31-33 were previously cancelled.
Claims 1, 2, 4-10, 34, 36 and 37 are cancelled.
Claims 21-30 were not reexamined.

* * * * *

(12) EX PARTE REEXAMINATION CERTIFICATE (8423rd)
United States Patent
Brodsky et al.

(10) Number: US 5,774,186 C3
(45) Certificate Issued: Jul. 19, 2011

(54) INTERRUPTION TOLERANT VIDEO PROGRAM VIEWING

(75) Inventors: Marc Herbert Brodsky, Washington, DC (US); Steven Edward Millman, Spring Valley, NY (US); Thomas Kimber Worthington, Kula, HI (US)

(73) Assignee: Echostar Technologies L.L.C, Englewood, CO (US)

Reexamination Request:
No. 90/011,321, Jun. 30, 1998

Reexamination Certificate for:
Patent No.: 5,774,186
Issued: Jun. 30, 1998
Appl. No.: 08/659,125
Filed: Jun. 4, 1996

Reexamination Certificate C1 5,774,186 issued Feb. 3, 2009

Reexamination Certificate C2 5,774,186 issued Nov. 9, 2010

Related U.S. Application Data
(60) Provisional application No. 60/009,435, filed on Dec. 29, 1995.

(51) Int. Cl.
*H04N 5/44* (2006.01)

(52) U.S. Cl. .................. 348/553; 348/563; 348/567; 348/E5.096; 348/E5.108
(58) Field of Classification Search .................. None
See application file for complete search history.

(56) References Cited

U.S. PATENT DOCUMENTS

| 5,438,423 A | 8/1995 | Lynch et al. |
| 5,442,390 A | 8/1995 | Hooper et al. |
| 5,659,539 A | 8/1997 | Porter et al. |

FOREIGN PATENT DOCUMENTS

EP 0 594 241 A1 4/1994

*Primary Examiner* — Roland G Foster

(57) ABSTRACT

Allows a video broadcast viewer to pause at anytime while viewing a program, and upon returning to be able to view the intervening segment. The video received during the pause period is stored and available for recall upon user command. The storage medium is circular in so much that the memory, upon becoming filled to capacity continues to write incoming information data over the previously stored data. The storage circuits employs a sequential access storage device and/or a direct access storage device. The storage circuit has a high speed memory input buffer and a high speed memory output buffer to account for the relatively long READ and WRITE access times of the storage device employed. At the end of the pause period, the user can view the stored video. The user has a choice between catching up to the regular broadcast or watching the remaining program video in a delay mode. The stored video may be viewed intermittently or continuously in regular, slow or fast motion, under user direct or remote VCR-type of video function control.

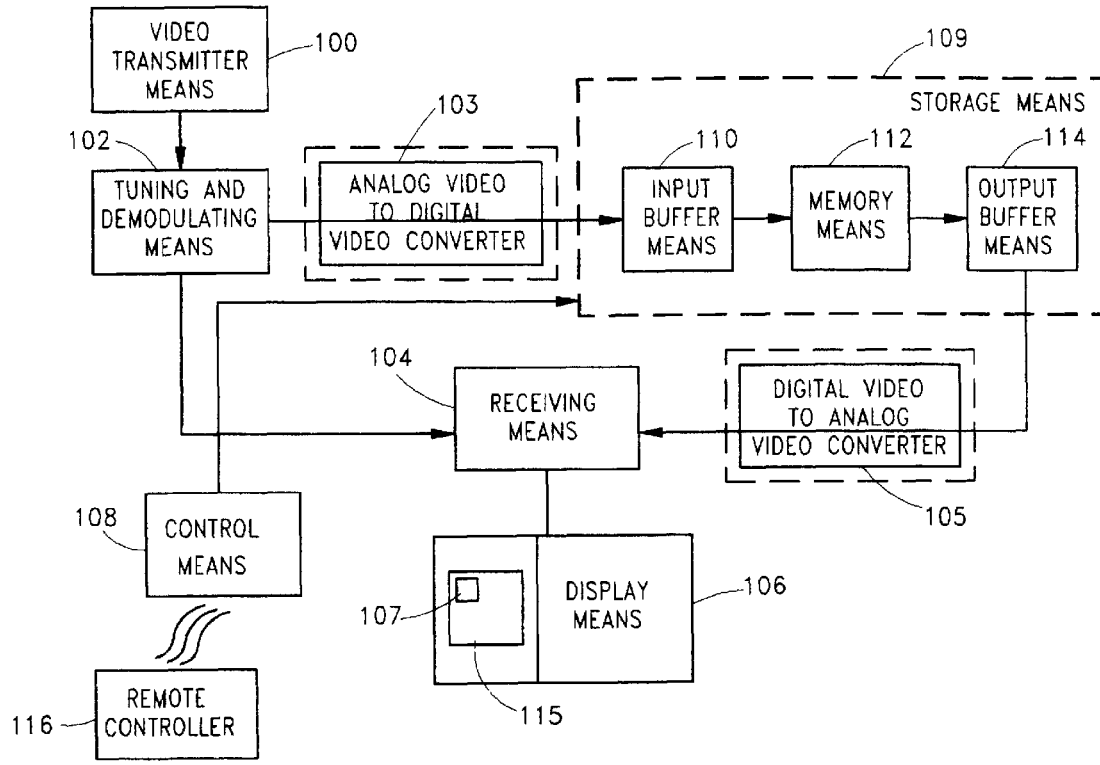

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 11-20 and 35 is confirmed.

Claims 1, 2, 4-10, 31-34, 36 and 37 were previously cancelled.

New claims 38-41 are added and determined to be patentable.

Claims 21-30 were not reexamined.

*38. The apparatus of claim 11 wherein said catch up circuit provides catch up by skipping a commercial.*

*39. The apparatus of claim 11 wherein said catch up circuit provides catch up by picture in picture.*

*40. The apparatus of claim 11 wherein said catch up circuit provides catch up by screen splitting.*

*41. The apparatus of claim 11 wherein said storage circuit includes a dual port buffer.*

\* \* \* \* \*